Figure 1:
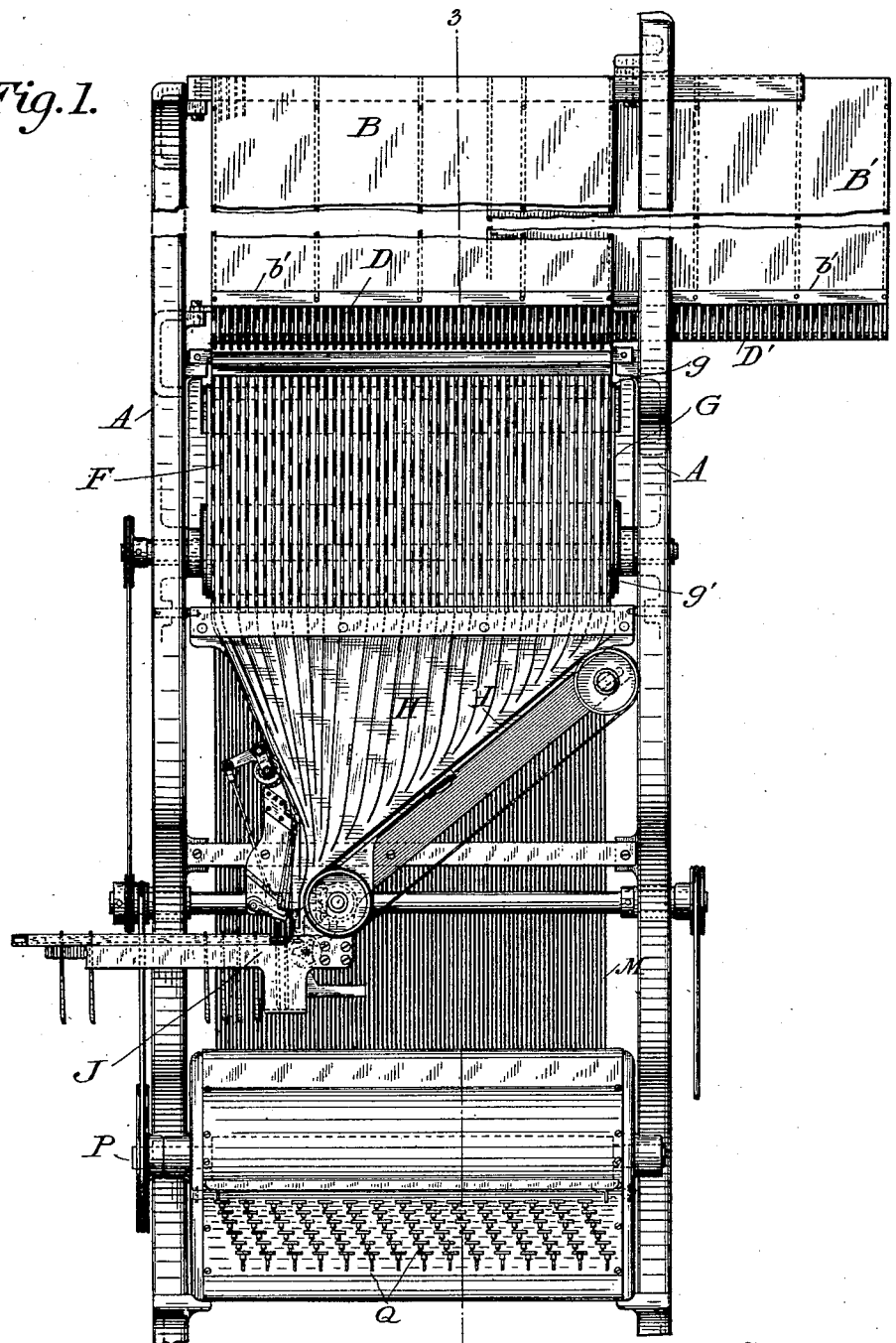

No. 886,586. PATENTED MAY 5, 1908.
A. DOW.
LINOTYPE MACHINE.
APPLICATION FILED JUNE 29, 1907.

6 SHEETS—SHEET 1.

Witnesses:
P. F. Barnes.
D. E. Burdine

Inventor
Alexander Dow
By his Attorney
P. T. Dodge

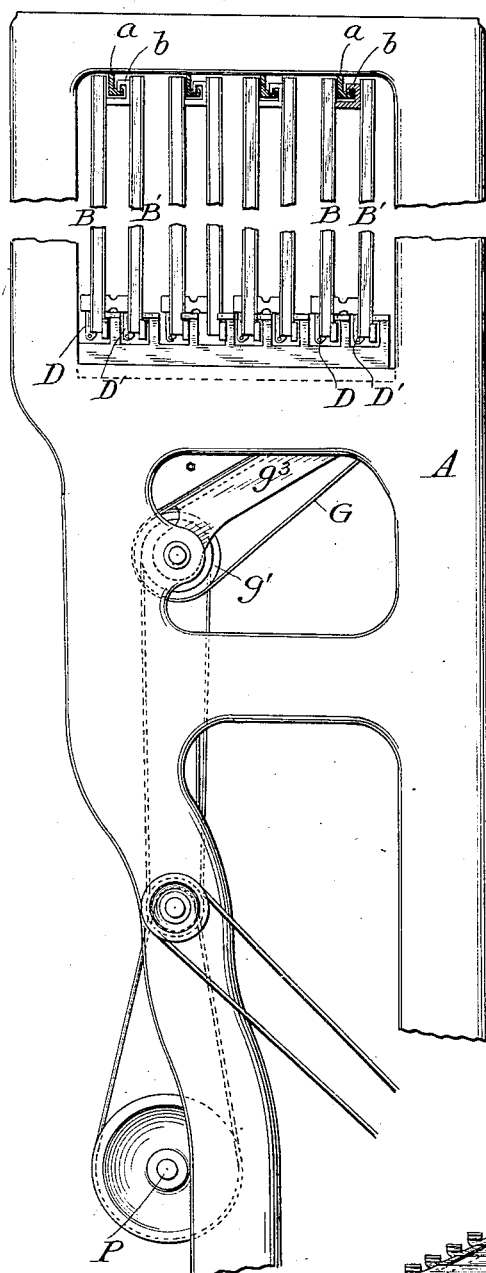
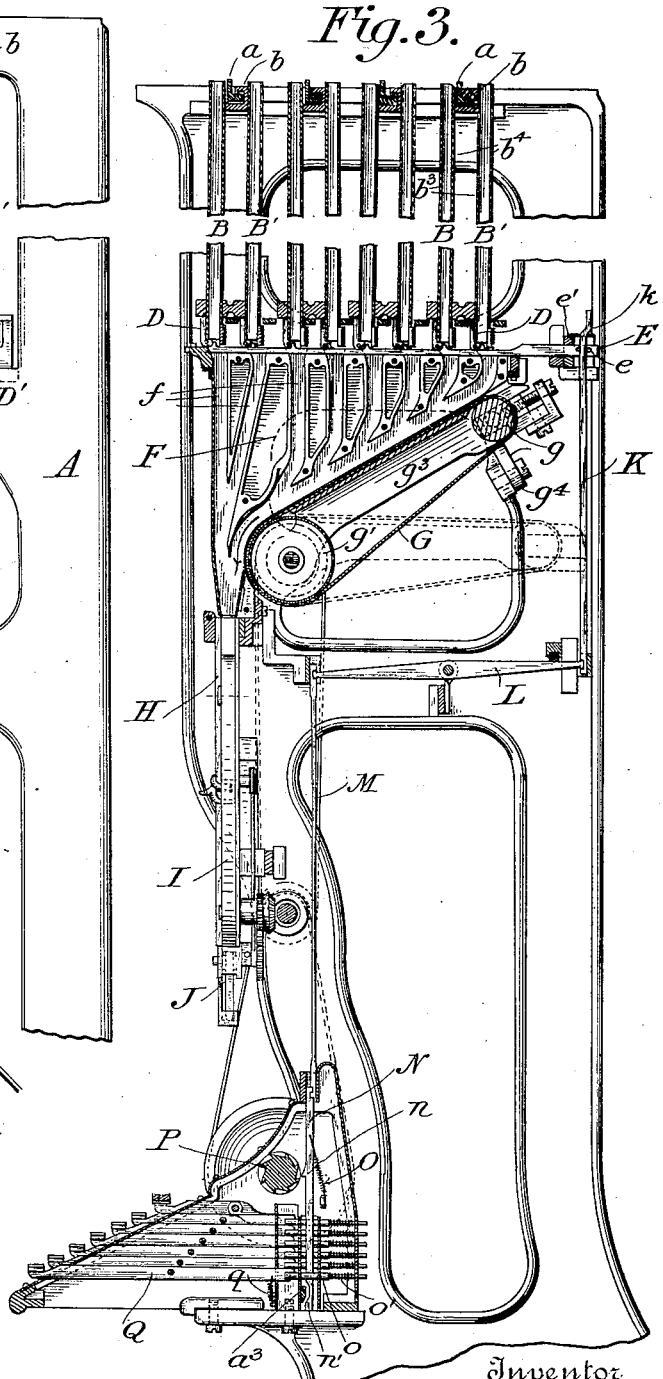

No. 886,586. PATENTED MAY 5, 1908.
A. DOW.
LINOTYPE MACHINE.
APPLICATION FILED JUNE 29, 1907.
6 SHEETS—SHEET 3.
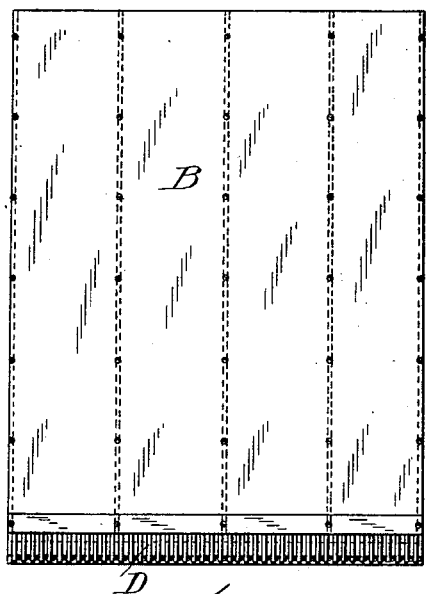
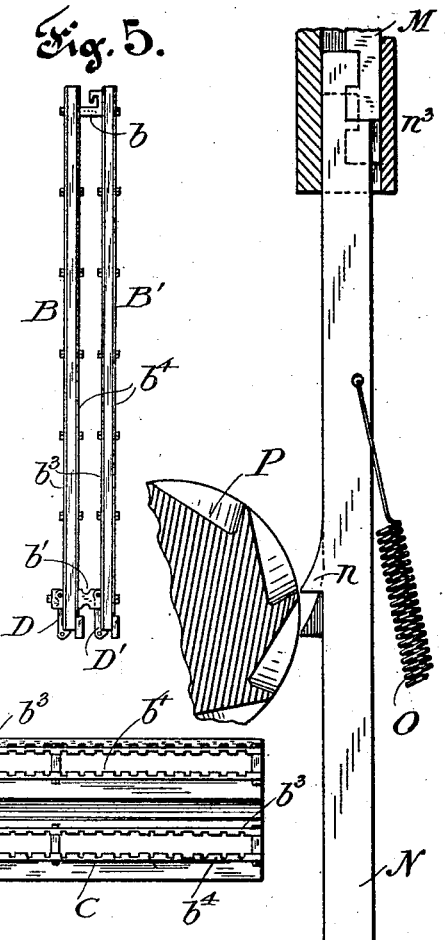
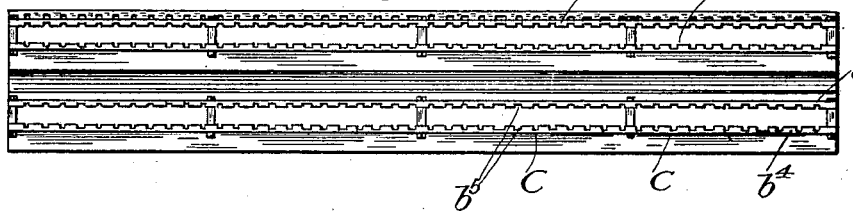
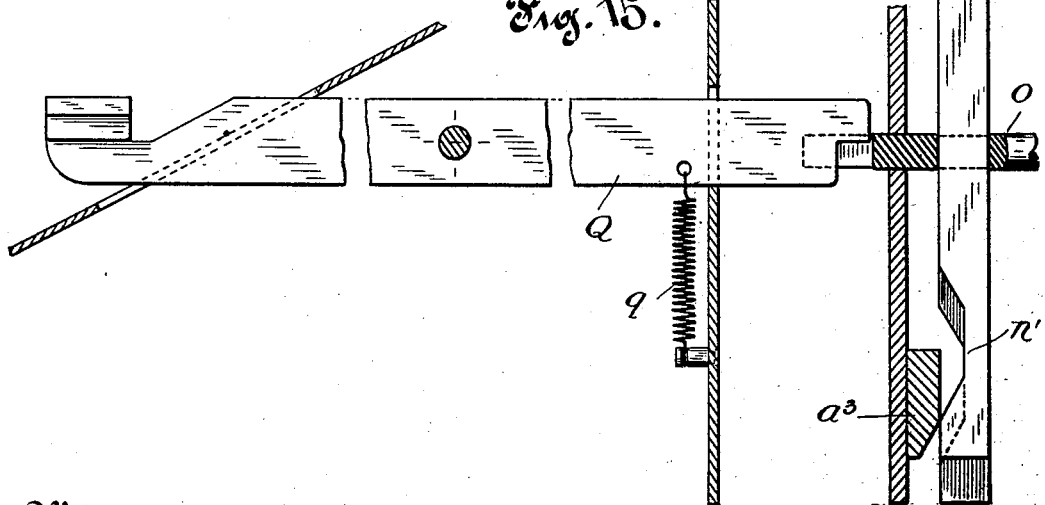
Witnesses:
P. F. Barnes.
D. E. Burdine.
Inventor
Alexander Dow
By his Attorney
P. T. Dodge

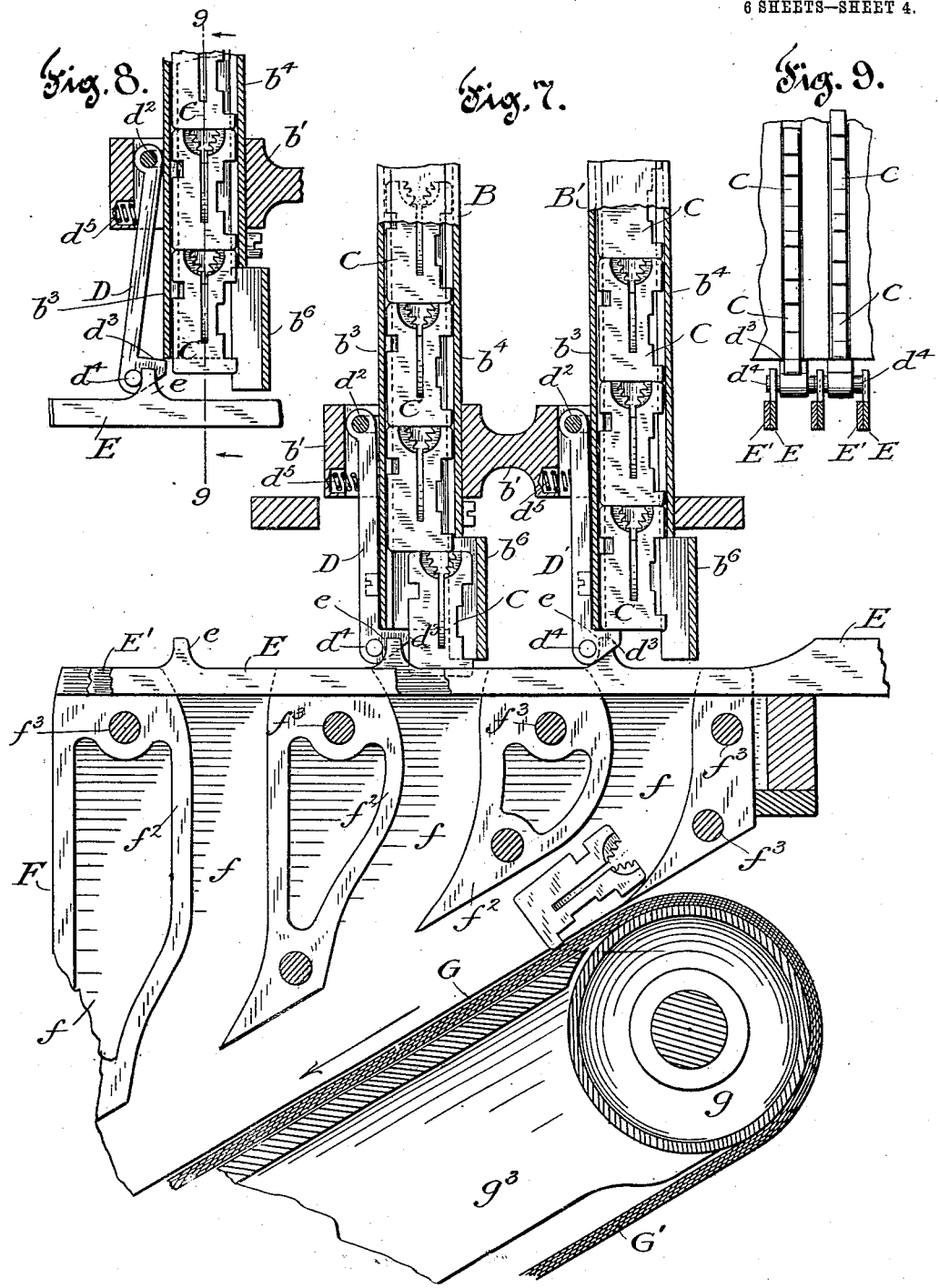

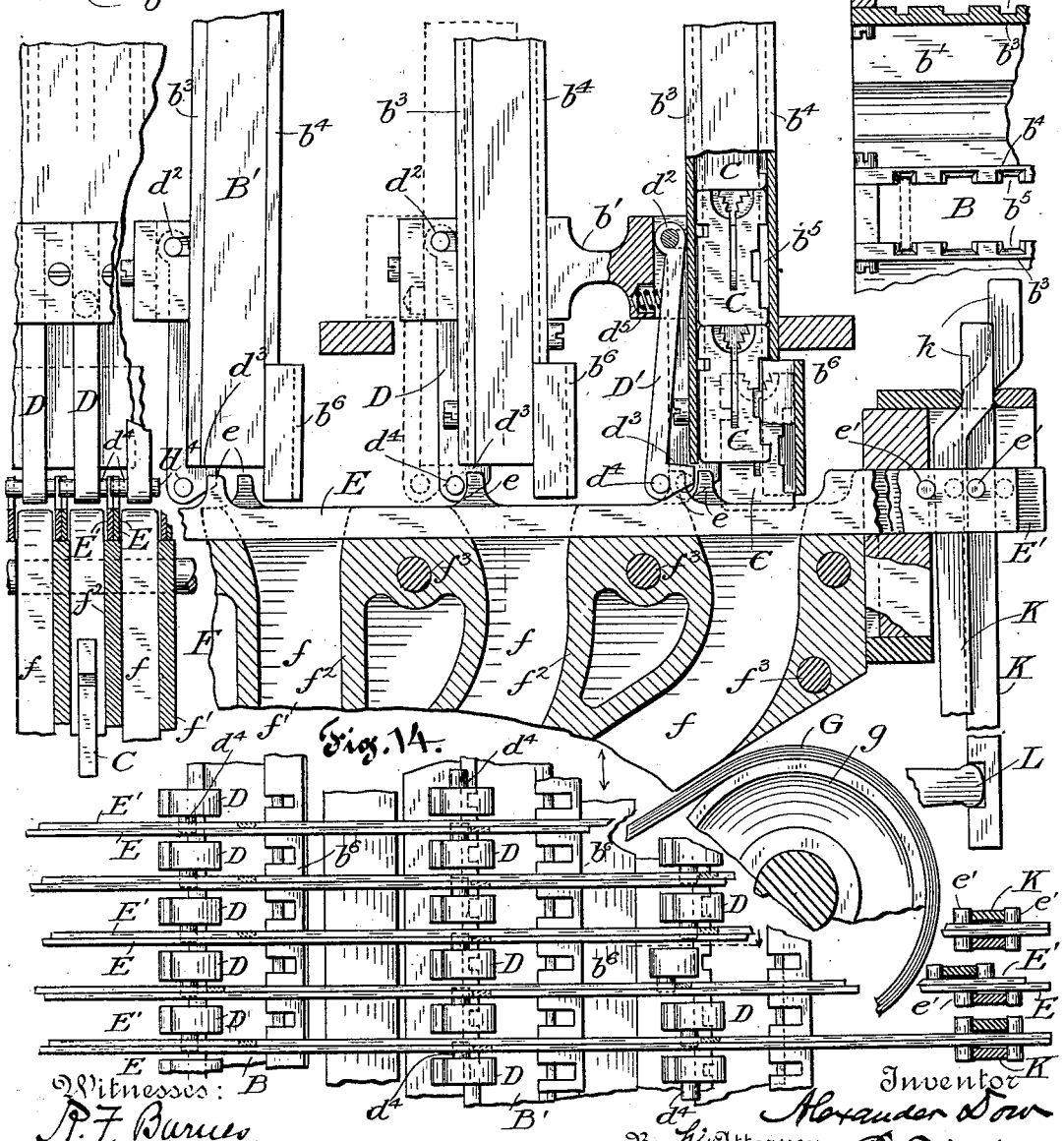

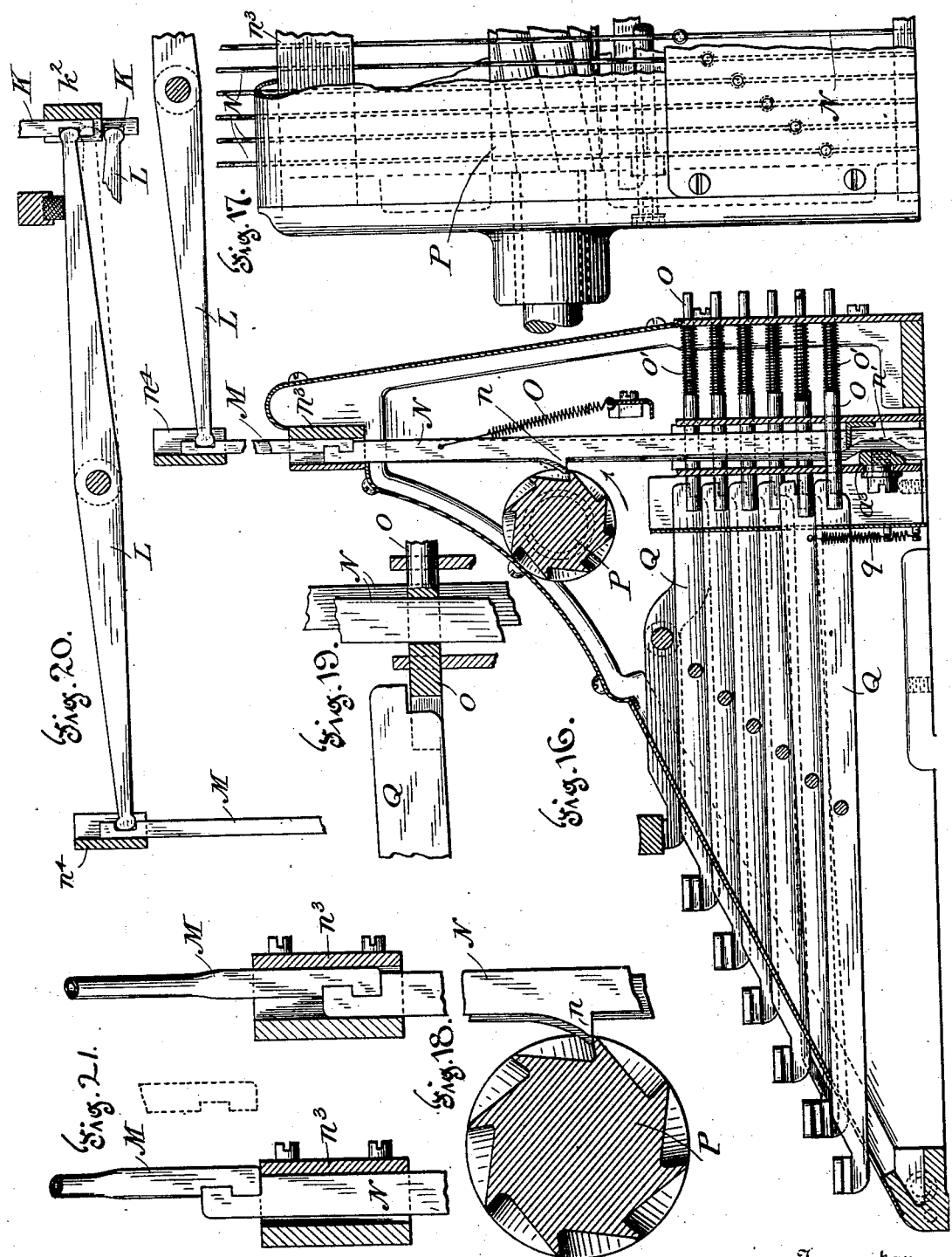

UNITED STATES PATENT OFFICE.

ALEXANDER DOW, OF NEW YORK, N. Y., ASSIGNOR TO MERGENTHALER LINOTYPE COMPANY, A CORPORATION OF NEW YORK.

LINOTYPE-MACHINE.

No. 886,586.  Specification of Letters Patent.  Patented May 5, 1908.

Application filed June 29, 1907. Serial No. 381,425.

*To all whom it may concern:*

Be it known that I, ALEXANDER DOW, of New York city, county of New York, and State of New York, have invented a new and useful Improvement in Linotype-Machines, of which the following is a specification.

My invention has reference to machines in which type metal slugs or printing bars, bearing on one edge the characters to print a line, are cast in a mold against a composed line of matrices momentarily presented to the mold. A leading machine of this character, known under the commercial name or trademark "Linotype", is represented as to its general organization in Letters Patent of the United States No. 436,532.

The aim of my invention is to provide a machine wherein a large assortment or variety of matrices may be carried in order that the operator may produce at will type faces of different sizes or styles.

To this end the invention consists in an improved manner of constructing and mounting the magazines in which the matrices are carried, in improved means for releasing the selected matrices one at a time from the respective magazines, and in improved means for assembling the released matrices in line. With the exception of the parts hereinafter described and specifically claimed, the machine may be of any ordinary or suitable construction, the casting and distributing mechanisms being foreign to the present invention.

In the drawings,—Figure 1 represents a front elevation of magazines and an assembling mechanism in accordance with my invention. Fig. 2 is a side elevation of the parts represented in the upper portion of Fig. 1 viewed from the right. Fig. 3 is a vertical section from front to rear on the line 3—3, Fig. 1 Fig. 4 is a front elevation of a pair of magazines with their escapements for releasing the magazines. Fig. 5 is an edge view of the same. Fig. 6 is a top plan view of the same. Fig. 7 is a vertical section through the lower end of a pair of magazines with their escapements and the attendant parts for receiving the released matrices. Fig. 8 is a vertical section through the lower end of the magazine with the escapement retracted for releasing the matrix. Fig. 9 is a cross-section on the line 9—9, Fig. 8. Fig. 10 is a front view of a portion of the upper end of the magazine and its support on an enlarged scale. Fig. 11 is a vertical cross-section on the line 11—11 of the preceding figure. Fig. 12 is a rear elevation of the parts shown in the preceding figure. Fig. 13 is a top view of a pair of magazines, one of them being shown in horizontal section Fig. 14 is a bottom plan view of a series of magazines, their escapements and the escapement actuating devices. Fig. 15 is a vertical section illustrating the key-board mechanism and connected parts on a large scale Fig. 16 is a vertical section from front to rear through the keyboard on the correspondingly numbered line of Figs. 1 and 17. Fig. 17 is a rear elevation of the parts shown in the preceding figure. Fig. 18 is a cross-section through the keyboard roll with the adjacent reeds in side elevation. Fig. 19 is a vertical section illustrating the action of one of the finger-keys and adjacent parts. Fig. 20 is a vertical section showing details hereinafter described. Fig. 21 is a vertical section illustrating the manner in which the slides and rods of Fig. 18 are raised clear of their guides to permit their disconnection.

Referring to the drawings, A represents a rigid main-frame which may be of the form shown or of any other form and construction adapted to sustain the operative parts.

B, B', are the magazines arranged in pairs and suspended vertically in the main-frame to sustain or carry the matrices C, which may be of the form shown or of any other suitable form.

D, D', are the escapements for releasing the matrices one at a time from the respective magazines.

E, E', are the horizontally reciprocating bars for actuating the escapements.

F is a stationary race-frame, so-called, containing a series of vertical channels through which the released matrices descend.

G is an inclined continuously traveling apron on which the released matrices are received, and by which they are carried downward to the front of the machine.

H is a vertical face-plate having a series of upright channels to which the matrices are delivered by the apron G through which they descend.

I is an inclined assembler belt upon which the matrices are received from the face-plate, and by which they are carried downward and delivered successively into the assembler J.

*Magazines.*—The magazines B, B', are arranged in pairs, those of each pair being screwed or otherwise secured at their upper and lower ends to the intermediate horizontal bars $b$ and $b'$. The upper bars $b$ are made of a hook-form in cross-section, and are engaged over horizontal bars $a$ in the main-frame, as shown in Figs. 2, 3, 11, &c. In this manner, each pair of magazines is suspended from the upper end so that the lower ends may be swung forward and backward to a limited extent to cause the action or non-action of the matrix-releasing devices, as hereinafter described. Each magazine consists of two parallel plates $b^3$ and $b^4$ secured to intermediate spacing pieces and provided in their opposing faces with vertical grooves or channels $b^5$ to receive and guide the edges of the matrices C, which pass through the magazines from the upper to the lower ends. The delivery of the matrices into the magazines will be effected by a distributing mechanism of any suitable character, such mechanism being foreign to the present invention. Each magazine has its rear plate $b^4$ terminated at the lower end above the lower end of the companion plate $b^3$, so that when a matrix has passed below the end of the rear plate, it may be carried backward in an edgewise direction, as shown in the left-hand magazine of Fig. 7, and the right-hand magazine of Fig. 11. For the purpose of receiving and guiding the matrices thus moved to the rear, each magazine is provided with a fixed plate $b^6$ set outward or rearward beyond the body of the magazine and containing vertical channels which register with those in the magazine.

*Escapement mechanism.*—For the purpose of releasing the matrices one at a time, I secure outside of and adjacent to each magazine-plate $b^3$, pendent escapements D, one for each channel in the magazine. These escapements have their upper ends seated in grooves in the bars $b'$ on horizontal pivots $d^2$, so that their lower ends may swing to and from the magazine. Each escapement is formed at the lower end with a lip or shoulder $d^3$ adapted to pass beneath the lowermost matrix in the corresponding channel, thereby preventing its escape and sustaining the column of matrices above. The escapements are held normally in engagement and returned to their normal positions by means of springs $d^5$ seated on the bars $b'$ and bearing against the escapements, as shown in Figs. 7, 11, &c. The matrices in a given column are released one at a time by momentarily moving the escapement backward to the position shown in Fig. 8, and also on the right-hand in Fig. 11, until the lip or shoulder $d^3$ is clear of the matrix, whereupon the entire column of matrices will descend by gravity.

As soon as the lowermost matrix stands opposite or in front of the escapement shoulder $d^3$, the escapement is released and permitted to return to its original position. In so doing, it acts on the vertical edge of the released matrix, and carries the same rearward to a position occupied by the lowermost matrix in Fig. 11. The matrix thus carried to the rear is permitted to continue its downward course out of the magazine, being guided by the plate $b^6$, but the succeeding matrix will strike upon and be arrested by the lip $d^3$, which assumes its original position before the matrix contacts therewith. In other words, the retraction of the escapement D effects the release of the bottom matrix, while the return of the escapement carries the released matrix edgewise out of line with those above, while permitting it to continue its downward course. The escapement in every case returns to its operative position in time to prevent the escape of the second matrix.

It is to be observed that in my mechanism the escapement shoulder or lip $d^3$ is the sole means for controlling the escape of the matrices one at a time from the lower end of the column in the magazine. It is also to be observed that when the escapement shoulder is withdrawn, the lower end of the matrix channel is open and unobstructed so that the matrices may descend in a straight course out of the magazine. Time is an essential factor in the operation of the device.

The springs are made of such strength, and the parts so arranged, that the shoulder is withdrawn just long enough to release the lowermost matrix and permit it to descend far enough to prevent the reëngagement of the shoulder thereunder, after which the shoulder is instantly restored to its first position in order to stand beneath and arrest the next matrix as the column continues its descent. Although the shoulder in returning to its original and normal position acts against the first matrix and moves the same horizontally, it is to be observed that this action has nothing whatever to do with the release of the first matrix. At the time this action occurs, the first matrix has been already released.

I believe the present mechanism to be the first in which an escapement engaging and supporting a matrix at the lower end of a column, has been adapted to serve as the sole means of releasing the matrices one at a time, and the first instance in which a supporting shoulder, after being withdrawn from beneath a column of matrices, has been returned in time to arrest the second matrix while permitting the first to escape. A wide distinction is to be drawn between this form of escapement, in which a single detaining shoulder releases the matrices successively at the same time holding in check the succeeding matrices, and those rotary and vibratory devices which are provided with two or more alternately or successively acting shoulders to engage the successive matrices.

As the pivot of the escapement D is out of line with the matrices, the spring-supported escapement yields slightly under the impact of the descending matrices. In consequence of this action, it softens or cushions the blow so that the deformation of matrices and the escapement is prevented.

For the purpose of operating the escapements to release the selected matrices, I may employ devices of any suitable character connected with finger-keys or their equivalent, but I prefer to employ the mechanism shown in Figs. 7, 8, 9, 10, 11, &c., consisting of horizontally reciprocating bars E, E', guided in the main-frame and provided with upwardly extending lips $e$ arranged to engage studs $d^4$ on the sides of the escapements D.

I commonly use in the machine two, three, or more pairs of magazines, and I provide each actuating bar with a number of lips adapted to operate the corresponding escapements of several magazines. The bars have a fixed field of movement, and if all the magazines were permitted to remain in operative position, each bar would cause the simultaneous movement of several escapements and the consequent discharge of several matrices. It is to avoid this action that the magazines are suspended to swing laterally as before described.

When matrices are to be drawn from a given pair of magazines, they are swung to the position shown in full lines in Figs. 7 and 11, so that their escapements will be acted upon by the corresponding bar E or E'. In the meantime, the other magazines, from which matrices are not demanded at the moment, are swung to the left, as indicated by the dotted lines in Fig. 11, so that their escapements are carried beyond the field of the lips of the actuating bars. Hence it is that a bar, serving to actuate the escapements of several magazines, is limited in its action to one escapement at a time.

In order to admit of the parts being assembled in a limited space, I arrange the bars E, E' in pairs, the two bars of each pair lying side by side in suitable guides. One bar has its lips arranged to actuate the escapements of the forward magazine in each pair, while the companion bar is arranged to operate the escapements of the rear magazines. That this may be done, the respective escapements have their studs extended to the right and left, as shown in the drawings.

*Keyboard mechanism.*—I recommend as the best mechanism for operating the bars E, E', the arrangement shown in Figs. 3, 15, 16, 17, 18, &c., in which K represents vertical reeds or slides guided in the main-frame, and having their upper ends bent or offset, as shown at $k$, and arranged to pass between studs or rollers $e'$ on the respective bars E, as shown in Fig. 3, so that as the reeds are carried upward and downward, they effect the positive reciprocation of the bars E. By giving the reeds an over motion, that is to say, a motion sufficient to carry the inclined portions beyond the studs $e'$, the bars E may be given a pause or dwell at either or both ends of their movement. Thus they may be caused to hold the escapements backward out of engagement for any required length of time. The reeds K are jointed at their lower ends to levers L, which are centrally pivoted in the main-frame and jointed at their forward ends to rods M, which are also guided in the main-frame and extended downward to vertical slides N, which are also guided in the frame and urged constantly downward by springs O. The series of slides N stand in a common line and are each provided with a lip $n$, see Figs. 3 and 5.

P, is a horizontal constantly rotating roll, journaled in the main-frame and provided with a series of longitudinal teeth to engage the lips $n$. Each of the slides N passes at its lower end through a horizontally guided rod $o$ urged forward by spiral springs $o'$, the tendency of these parts being to move the lower ends of the slides forward so that the lips $n$ will be engaged by the teeth of the roll. Normally, however, the engagement is prevented by a finger-key Q pivoted at its middle in the main-frame and having its rear end shouldered, as shown in Figs. 3 and 15, to engage the rod $o$ and hold the same back against the pressure of spring $o'$. When the parts are in this position, the roll revolves without effect upon the other parts. When, however, the forward end of the finger-key is depressed, the shoulder at its rear end is disengaged from the rod $o$, and the latter permitted to slide forward under the influence of a spring carrying with it the lower end of the slide N. In this manner, the lip $n$ on the slide is brought into the path of one of the teeth on the roll, as shown in Figs. 16 and 18, whereupon the roll acts to lift the slide N, and through the intermediate parts, move the escapement-actuating slide E.

Each slide N has in one edge at the lower end a notch or depression $n'$ in position to receive, when the slide moves forward, a horizontal fixed bar $a^3$ in the main-frame. It will be observed that this bar is held in place by screws passing through slots in the frame. This admits of the bar being raised or lowered so that the slides may be tripped out of engagement with the actuating roll sooner or later. This provision is advantageous in that it permits compensation for the wear of the parts and also in that it permits the machine to be adjusted as peculiarities in the "touch" of the different operators may demand when the machine is to be driven at high speed. As the slide is lifted by the action of the roll P, the lower inclined wall of the notch rides against the bar $a^3$, the effect being to gradually move the bar edgewise to the rear, in the manner shown in Fig. 15, until the lip $n$ is disengaged, whereupon the slide N is instantly pulled downward to its original position by the spring O.

As the slide is moved rearward by the bar $a^3$, it carries with it the guide-rod $o$ far enough to permit the end of the finger-key Q to fall to its original position, as shown in Figs. 3, 16 and 19, whereby the slide is held out of engagement until the key is again actuated. In order to insure the downward movement of the key at its rear end, the spring Q may be connected therewith. It will, of course, be understood that the various finger-keys represent the respective characters and spaces, and that in number, the keys equal the channels in one pair of magazines.

The keys are provided, as usual, at the forward end with buttons bearing respective characters, and whenever a key is actuated, a matrix of a corresponding character or a corresponding space is delivered from one of the two magazines which are in operative position. In order to deliver the required characters from any pair of magazines, it is only necessary to swing that pair to the operative position and to swing the others away from their operative positions, so as to carry their escapements beyond the field of the actuating devices, the one series of finger-keys serving for all of the magazines.

The actuating roll P may be provided with any suitable number of teeth of any suitable form in cross-section, and they may be extended parallel with the axis of the roll, or arranged spirally around the same, as indicated in the drawing. The spiral arrangement is preferred for the reason that it prevents the engagement of two bars on one tooth in the event of their being released in rapid succession.

It is obvious that two, three or more of the slides N may be engaged at one time with successive teeth on the roll. In such event, although the slides are in motion at one time, they will cause the release of matrices successively and in the order in which the keys are actuated, so that transpositions in the composed line are prevented. It is manifest that the form and relation of the key-board members may be widely modified within the range of mechanical skill and without changing their mode of action.

In order to permit the convenient assemblage and separation of the parts, I recommend the following details of construction. Each slide N and rod M has its connecting ends notched together edgewise, as shown in Figs. 15 and 16, their engagement being maintained by the grooved guide $n^3$ in which they slide. Each rod M has its upper end notched to admit the end of the lever L, and is held in engagement therewith by the fixed guide $n^4$. In like manner, the lever L is seated at the opposite end in a notch in the reeds K, which are held in engagement by the guide $k^2$. By lifting the slides N above their normal operative positions, the various joints are carried beyond the respective guides $n^3$, $n^4$ and $k^2$, so that the parts may be readily slipped apart.

*Assembling mechanism.*—For the purpose of assembling in a common line the matrices released from the magazines, I provide the race-frame F, apron G and the face-plate H. The race-frame F, located below the magazines, contains a series of vertical channels or passages $f$ corresponding in number and location to the columns of matrices in the respective magazines, their purpose being to receive the released matrices and direct them downward upon the carrier apron G. The passages $f$ are of such width as to maintain the matrices on edge, or in other words, to prevent them from turning over on their side faces, and they are curved forward and downward in the direction in which the apron travels, so that each matrix, descending by gravity, is gradually turned forward at the lower end, so that its longitudinal edge bears upon the apron, as shown in Fig. 7. The apron, which is constantly driven in the direction indicated by the arrow, stands at an inclination, as shown, and serves to carry the matrices successively downward toward the front of the machine. The apron, as shown, passes over two horizontal sustaining rolls $g$ and $g'$, and as the matrices pass downward from the forward end of the apron, they are caused to again assume a vertical position and pass downward through the channels of the face-plate H to the surface of the assembling belt I. This belt lies transversely of the machine, or in other words, its course of travel is at right angles to that of the apron G, so that the matrices received upon the belt rest upon their side faces and are carried downward endwise one after another into the slotted assembler J. As they enter the assembler they are acted upon successively on their side faces by the rotary star-wheel R, by which they are forced laterally into the assembler and assembled side by side in a common line, this part of the action being essentially the same as the assemblage of the matrices in the well-known linotype machine of the present day.

The race-frame F may be constructed in any suitable manner provided only it contains the narrow passages or channels extending downward from the points at which the matrices are delivered from the magazines, and thence forward above the conveyer apron, and is adapted to sustain the traveling matrices on edge. I prefer, however, to construct this race-frame F as shown in the drawings, of a series of vertical plates $f'$, separated by intermediate metal frames or plates $f^2$, having such marginal form as to afford the passages $f$ between them. The entire series of plates may be connected together by tie-rods $f^3$ extended horizontally through them, or they may be connected in any other suitable manner.

As it may sometimes happen that matrices will be arrested in their course to the face-plate, it is desirable to give free access to the throats or passages $f$, and for this purpose I mount the roll $g$, which sustains the rear end of the apron G, in a frame $g^3$, arranged to swing about the axis of the forward roll $g'$. This arrangement admits of the frame and apron being swung downward at will from the operative position to the position shown by dotted lines in Fig. 3, thus exposing the upper surface of the apron and the lower ends of the throats $f$. The frame $g^3$ may be sustained in its operative position by any suitable means, for example, by the pivoted buttons or latches $g^4$.

*General operation.*—The operation of the mechanism as a whole is as follows. The matrices are arranged in columns in the respective magazines, and the lowermost matrix of each column is sustained by one of the escapements D or D'. The pair of magazines from which matrices are to be drawn are swung to the right so as to bring their escapements D within the path of the lips on the bars E, while the remaining magazines are swung to the left so as to carry their escapements beyond the path of the matrices. The operator now manipulates the keys Q in the order in which their characters and intermediate spaces are to appear in the line. As each key is depressed at the front, its rear end is raised out of engagement with the rod $o$ which is thereby released so that it may be thrown forward by the spring $o'$. The effect of this is to carry the lower end of the slide N forward so as to bring its lip $n$ into the path of one of the teeth on a constantly turning roll P. The roll immediately lifts the slide N against the stress of the spring O, and the slide in turn lifts the connecting rod M which, through the lever L, actuates the reed K, which in turn actuates the escapement D, disengaging it from the lowermost matrix in the column. The column of matrices immediately descends. The lowermost matrix in passing the escapement, is acted upon and carried edgewise to the rear, while continuing its downward course, the escapement assuming its original position in time to encounter and arrest the next succeeding matrix. The released matrix continues its course downward through the throat or channel $f$ to the apron G, and lying edgewise thereon is carried forward and delivered in a vertical position, downward through a channel in the face-plate H, whence it is delivered on its side to the belt I, and finally delivered from the latter in front of the star-wheel into the assembler J. This action is repeated as the successive keys are actuated, and the matrices thus assembled in the required order in a compact line in the assembler. From the assembler, the line will be transferred by any ordinary or appropriate mechanism to the casting mechanism, and returned through a distributer to the upper end of the magazines, as is usual in machines of this class.

*Removable magazines.*—A machine constructed on my plan may contain a sufficient number of magazines and a sufficient assortment of matrices to meet all ordinary requirements, but in order to permit a change in the assortment of matrices, it is only necessary to remove one pair of magazines and replace them by another containing the required matrices. As the matrices are suspended by the hook-shaped bars at their upper ends, and as their escapements stand normally out of line with the projections on the bars E, any pair of magazines may be withdrawn edgewise from the machine at will, in the manner indicated in Fig. 1, and after being thus removed, they may be replaced by another pair of magazines thrust edgewise into the machine. The magazines may be made of any desired size and with any desired number of channels, but I commonly construct them so that the upper case characters will be carried in one magazine, and the corresponding lower case characters in the other,—a pair of magazines being thus adapted to receive one complete font of matrices. Any suitable means may be employed for swinging the lower ends of the magazines to and from their operative positions, and for holding them in the inactive positions. Simple means for the purpose it a rocking bar mounted in the frame adjacent to each pair of magazines, as shown at T in Figs. 2, 3, 7, &c.

It is obvious that the constructions above described may be used not only in machines for casting slugs or linotypes, but in typographic machines in general such, for example, as machines for casting logotypes or single type in the order of use.

So far as the carrying of the escapements of the magazine beyond the field of their actuating devices by the movement of the magazine is concerned, it is of course immaterial whether the magazines are coupled together in pairs or not. The claims herein referring to the magazines movable for this purpose are intended to apply to both single and double magazines.

Having described my invention, I claim as my invention and desire to secure by Letters Patent:—

1. In a typographic machine, a main-frame and mechanism therein for actuating escapements, in combination with two parallel connected magazines provided with escapements mounted in the frame and removable jointly therefrom at will.

2. In a typographic machine, two parallel magazines permanently connected, and a sustaining frame in which said magazines are mounted and from which they are jointly removable at will.

3. In a typographic machine, the combination of a main-frame, two parallel magazines rigidly united and sustained in the frame by horizontal supports adapted to permit the magazines to be removed jointly in an edgewise direction at will.

4. In a typographic machine, a main-frame, escapement-actuating devices mounted therein, in combination with a magazine mounted in the frame and provided with escapement devices, said magazine movable at one end only beyond the path of the actuating devices; whereby the delivery of matrices may be prevented without disturbing the receiving end of the magazine.

5. In a typographic machine, a pendent swinging magazine provided with escapements, in combination with transversely moving means for actuating the escapements; whereby the delivery of matrices may be prevented without changing the movement of the actuating devices.

6. In a typographic machine, a magazine through which matrices descend by gravity, in combination with an escapement having a shoulder to engage and sustain the end matrix and the column above it, means for withdrawing the escapement to release the matrix, and means timed to cause the return of the escapement to its original position before the arrival of the second matrix; whereby the single stop surface is enabled to effect the release of the matrices one at a time.

7. In a typographic machine, the combination of a magazine arranged to deliver matrices by gravity, an escapement having one shoulder only, to engage beneath the end of the lowermost matrix and thereby sustain the column of matrices, and means whereby the escapement is withdrawn to release said matrix and returned in time to engage the second matrix.

8. An upright magazine adapted to carry a column of matrices, and an escapement D acting as the sole means for controlling the delivery of the matrices, said escapement adapted to engage the lowermost matrix of the column, in combination with a spring tending to retain the escapement in engagement and means for disengaging the escapement at will and permitting its immediate return in time to engage beneath the second matrix.

9. In a typographic machine, a magazine B, having an open lower end to permit the vertical escape of the matrices, an escapement D adapted to engage only beneath the end matrix in the magazine, a spring to hold the escapement in its normal position, and a reciprocating bar E to actuate the escapements.

10. In a typographic machine, the magazine B, the movable escapement D to engage the end matrix, a spring acting to return the escapement, an actuating device having a fixed path of movement and adapted to disengage the escapement from the matrix, said magazine movable laterally from its operative position; whereby the action of the escapement is prevented although the actuating device may be moved.

11. In a typographic machine, a series of magazines each provided with escapements, in combination with actuating devices each extended past two or more magazines and adapted to operate corresponding escapements simultaneously, said magazines being independently movable at the delivery end to carry the escapements beyond the field of the operating devices; whereby the escapements of any magazine may be thrown into or out of action by moving said magazine and without disturbing the others.

12. In a typographic machine, a series of laterally movable magazines each provided with escapements, in combination with devices each adapted to actuate the escapements of two or more magazines; whereby the escapements of either magazine may be brought into action to the exclusion of the others.

13. In a typographic machine, an upright channeled magazine, having its lower end offset on one side to permit edgewise movement of an outgoing matrix, in combination with an escapement adapted to engage beneath the end matrix, and also adapted to act edgewise against the matrix subsequent to its release; whereby the escapement is permitted to resume its normal position to engage the second matrix without arresting the first.

14. A magazine consisting of the long plate $b^3$, the opposed plate $b^4$ terminated at a higher level, and the grooved plate $b^6$, in combination with escapements adapted to pass beneath the lower end of the magazine, and means for actuating said escapements.

15. In a typographic machine, two magazines B, B', and an intermediate connecting member $b$, in combination with a fixed support $a$ engaging said member.

16. In combination with the magazines B, B' and the intermediate connecting member $b$, the horizontal support $a$ engaging said member and adapted to permit the removal of the magazines in an edgewise direction.

17. In combination with the magazines B, B' and a connecting member $b$, a support $a$ engaging said member and adapted to permit the swinging movement of the magazines.

18. In combination with a magazine and an escapement for releasing matrices therefrom, an escapement-actuating bar E and a slide-actuating reed K having an oblique or offset portion to actuate the slide.

19. In combination with the magazine and an escapement for releasing matrices therefrom, an escapement-actuating bar E, a slide-actuating reed K having an inclined or offset portion, and means for reciprocating the reed and carrying the inclined portion beyond its operating position; whereby the slide is given a dwell during the continued movement of the reed.

20. In a typographic machine, in combination with an escapement-actuating device E, a slide-operating reed K having an inclined portion, a continuously rotating device, and means for imparting motion momentarily from said device in one direction to the reed, and a spring for returning the reed to its normal position.

21. In a typographic machine and in combination with a series of escapements D, D', having studs $d^4$, reciprocating bars E arranged in pairs to actuate the respective escapements.

22. In a typographic machine and in combination with a magazine arranged to deliver the matrices endwise, guiding throats $f$ adapted to receive the matrices and maintain them on edge, and a carrier apron G.

23. In a typographic machine and in combination with an inclined carrier apron G, a series of matrix-guiding throats extended downward and forward and adapted to deliver the matrices to the apron and maintain them edgewise thereon.

24. In a typographic machine, a series of upright magazines adapted to deliver the matrices from their lower ends in an upright position, an inclined carrier apron and intermediate throats extending downward and forward, said throats adapted to receive the matrices from the magazines and turn them forward on edge upon the apron.

25. In a typographic machine, the combination of a series of magazines arranged to deliver matrices in a downward direction, a series of guiding throats adapted to receive the matrices and hold them from turning upon their sides, an inclined apron arranged to receive the matrices on edge, and a vertically channeled face-plate arranged to receive the matrices in an upright position from the apron.

26. The combination of magazines arranged to deliver matrices in an upright position, throats which receive the matrices and hold them from turning upon their sides, an inclined carrier apron whereon the matrices are received edgewise, a vertically channeled face-plate which receives the matrices in upright positions from the apron, and a transverse assembler-belt I arranged to receive the matrices on their sides from the face-plate.

27. In a typographic machine and in combination with the throats or guides $f$ through which the matrices descend, the conveyer apron G mounted to be swung downward away from the throats, substantially as shown; whereby the lodged matrices are permitted to fall out of the throats, and access is afforded both to the surface of the conveyer and to the interior passages of the machine.

28. In a typographic machine, the combination of a continuously driven toothed roll P, toothed slides N to engage therewith, springs tending to move the slides endwise in opposition to the action of the roll, means tending to move the slides edgewise into engagement with the roll, finger-keys acting to hold them normally out of engagement, and a fixed member acting on the slides as they are moved endwise to disengage them from the roll.

29. In a typographic machine, in combination with the toothed slides N having inclined surfaces $n'$, the stationary trip $a^3$, the continuously driven toothed roll P to move the slides endwise in one direction, the spring O tending to move them in the reverse direction, spring-actuated rods $o$ tending to move the slides into engagement with the roll, and finger-keys normally engaging the rods $o$ to hold the slides out of engagement.

30. In a typographic machine, in combination with the toothed slides N and the continuously driven toothed roll P to move the slides endwise in one direction, springs O tending to move them in the reverse direction, means for throwing the slides into engagement with the roll, a trip-bar $a^3$ to disengage the slides from the roll, and means for changing the position of said bar; whereby the disengagement of the bars from the roll may be effected sooner or later, as required.

31. In a keyboard mechanism substantially as described, toothed escapement operating slides in combination with a continuously driven roll having spirally arranged teeth to actuate the slides; whereby the simultaneous operation of two escapements is prevented.

In testimony whereof I hereunto set my hand this twentieth day of June, 1907, in the presence of two attesting witnesses.

ALEXANDER DOW.

Witnesses:
G. W. BIRD,
FRANK C. JONES.